United States Patent [19]
Turbessi et al.

[11] Patent Number: 5,832,775
[45] Date of Patent: Nov. 10, 1998

[54] WINDSHIELD WIPER DRIVE ASSEMBLY

[76] Inventors: Timothy Turbessi; Jim Galloway, both of 51 Maxwell Rd., Rydol, Ga. 30171

[21] Appl. No.: 787,632
[22] Filed: Jan. 23, 1997
[51] Int. Cl.[6] .............................. F16H 21/40; B60S 1/24
[52] U.S. Cl. ............................................ 74/42; 15/250.3
[58] Field of Search .......................... 74/42, 43; 15/250.3

[56]  References Cited

U.S. PATENT DOCUMENTS

| | | | |
|---|---|---|---|
| 1,839,175 | 12/1931 | Hueber | 74/724 X |
| 3,415,132 | 12/1968 | Druseikis | 74/42 |
| 4,027,354 | 6/1977 | Burpee | 15/250.3 |
| 4,529,242 | 7/1985 | Watanabe et al. | 296/78.1 |
| 4,958,405 | 9/1990 | Kuhbauch | 15/250.33 |
| 5,274,876 | 1/1994 | Wehrspann | 15/250.17 |

*Primary Examiner*—Allan D. Herrmann
*Attorney, Agent, or Firm*—Joseph N. Breaux

[57] ABSTRACT

A windshield wiper drive assembly including a mounting bracket having a central motor support portion, a first bracket end connecting portion having a first mounting aperture formed therethrough, and a second bracket end connecting portion having a second mounting aperture formed therethrough; a reduction gear motor assembly mounted to the central motor support portion and having a motor assembly output shaft; a wiper shaft support secured to the central motor support portion and having a wiper shaft support bushing provided within a bushing aperture; a wiper shaft having a first wiper shaft end rotatably entrapped within the wiper shaft support bushing and a second wiper shaft end; a rotating crank wheel centrally mounted to the gearbox output shaft by a central shaft connection aperture and having a push rod connecting pin extending outward from a planar surface thereof; and a push rod linkage including a rigid push rod pivotally connected to the push rod connecting pin at one end thereof and pivotally connected at a second push rod end thereof to a wiper shaft arm that extends radially from the wiper shaft. In a preferred embodiment, the motorcycle windshield wiper drive assembly further includes a variable speed control mechanism for allowing the user to adjust the speed of the wiper movement as desired.

4 Claims, 3 Drawing Sheets

5,832,775

WINDSHIELD WIPER DRIVE ASSEMBLY

TECHNICAL FIELD

The present invention relates to drive assemblies for windshield wiper systems and more particularly to a windshield wiper drive assembly for a motorcycle windshield that includes a wiper drive shaft coupled to a drive motor through a pivoting push rod linkage and a rotating crank wheel.

BACKGROUND OF THE INVENTION

The visibility through a motorcycle windshield decreases significantly when driving the motorcycle in rainy weather. It would be a benefit, therefore, to have a windshield wiper system that could wipe the windshield of rain accumulation to increase the visibility through the windshield. It would be a further benefit to have a motorcycle windshield wiper drive assembly that was easily mounted to a motorcycle windshield.

SUMMARY OF THE INVENTION

It is thus an object of the invention to provide a motorcycle windshield wiper drive assembly.

It is a further object of the invention to provide a motorcycle windshield wiper drive assembly that is easily mounted to a motorcycle windshield.

It is a still further object of the invention to provide a motorcycle windshield wiper drive assembly that includes a wiper drive shaft coupled to a-drive motor through a pivoting push rod linkage and a rotating crank wheel.

It is a still further object of the invention to provide a motorcycle windshield wiper drive assembly that accomplishes all of the above objects in combination.

Accordingly, a windshield wiper drive assembly is provided. The drive assembly comprises a mounting bracket having a central motor support portion, a first bracket end connecting portion having a first mounting aperture formed therethrough, and a second bracket end connecting portion having a second mounting aperture formed therethrough; a reduction gear motor assembly, mounted to the central motor support portion, having a motor assembly output shaft; a wiper shaft support, secured to the central motor support portion, having a wiper shaft support bushing provided within a bushing aperture; a wiper shaft having a first wiper shaft end rotatably entrapped within the wiper shaft support bushing and a second wiper shaft end; a rotating crank wheel, centrally mounted to the gearbox output shaft by a central shaft connection aperture, having a push rod connecting pin extending outward from a planar surface thereof; and a push rod linkage including a rigid push rod rotationally connected to the push rod connecting pin at one end thereof and pivotally connected at a second push rod end thereof to a wiper shaft arm that extends radially from the wiper shaft. In a preferred embodiment, the motorcycle windshield wiper drive assembly further includes a variable speed control mechanism for allowing the user to adjust the speed of the wiper movement as desired.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE EXEMPLARY EMBODIMENT

Figure 1:
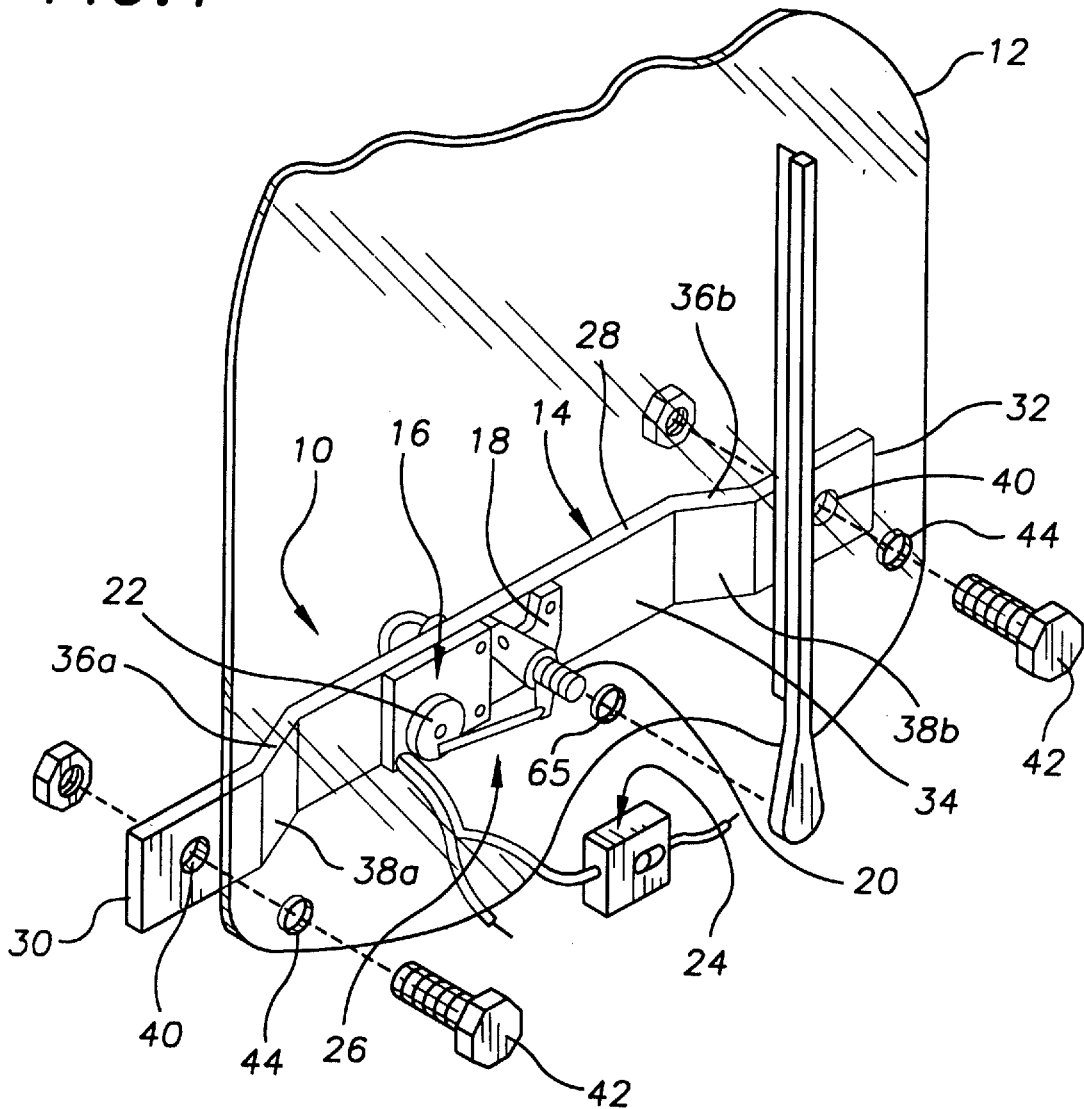
FIG. 1 is a perspective view of a representative motorcycle windshield and an exemplary embodiment of the motorcycle windshield wiper drive assembly of the present invention.

FIG. 1 shows an exemplary embodiment of the motorcycle windshield wiper drive assembly of the present invention, generally designated by the numeral 10, and a representative motorcycle windshield 12. Drive assembly 10 includes a mounting bracket, generally designated by the numeral 14; a reduction gear motor assembly, generally designated by the numeral 16; a wiper shaft support 18; a wiper shaft 20; a rotating crank wheel 22; a motor speed controller, generally designated by the numeral 24; and a push rod linkage, generally designated 26.

In this embodiment, mounting bracket 14 is constructed from a length of stainless steel bar stock that has been bent to form a central motor support portion 28, a first bracket end connecting portion 30, and a second bracket end connecting portion 32. Central motor support portion 28 is substantially rectangular shaped and has a planar mounting surface 34. First bracket end connecting portion 30 and second bracket end connecting portion 32 are, respectively, each connected to central motor support portion 28 by a connecting section 36a,36b. Each connecting section 36a,36b has a planar surface 38a,38b, respectively, that is oriented at an angle with respect to planar mounting surface 34 of about forty-five degrees. First and second bracket end connecting portions 30,32 each have a mounting aperture 40 formed therethrough to allow mounting bracket 14 to be easily affixed to windshield 12 by placing the bolt portion of nut and bolt fasteners 42 sequentially through windshield apertures 44 and mounting apertures 40.

Figure 2:
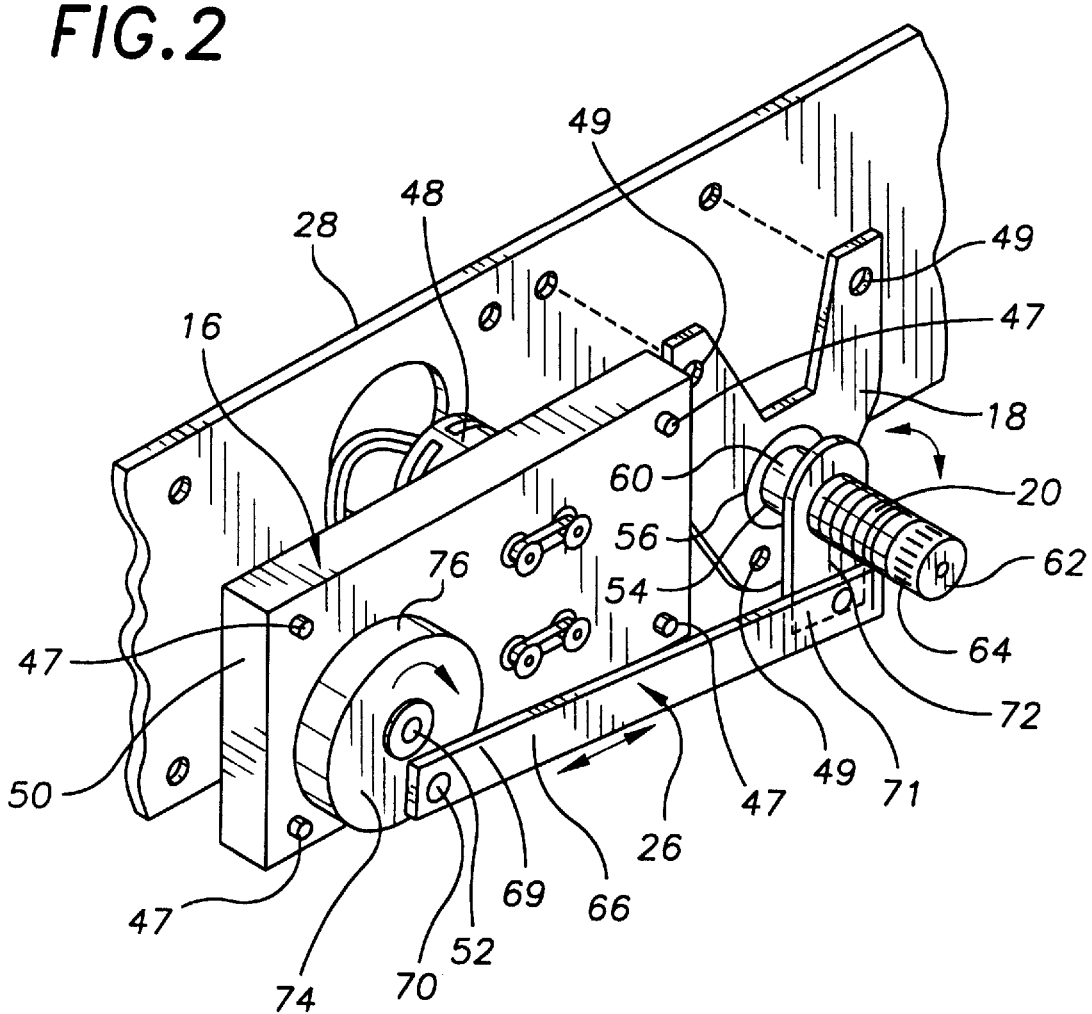
FIG. 2 is a detail view of the exemplary motorcycle windshield wiper drive assembly of FIG. 1 showing the central motor support portion of the mounting bracket, the reduction gear motor assembly, the motor speed controller, the wiper shaft support, the wiper shaft, the rotating crank wheel, and the push rod linkage including the push rod and the wiper shaft arm.
Figure 3:
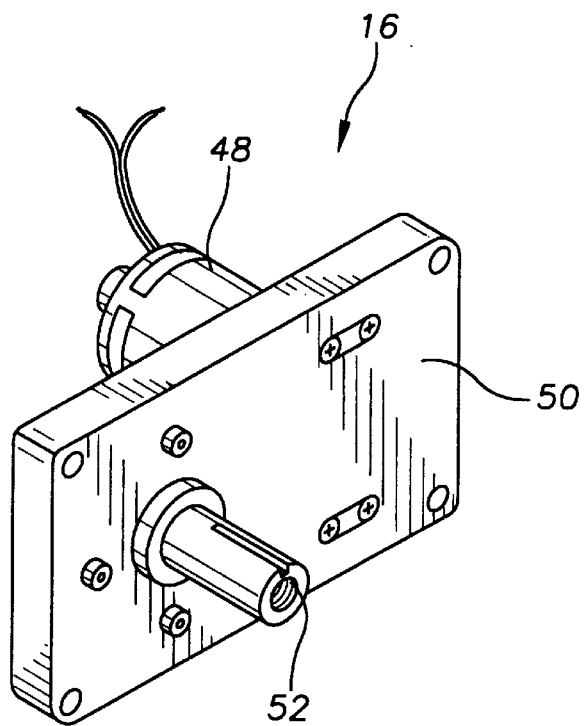
FIG. 3 is a perspective view of the reduction gear motor assembly including the variable speed electric motor and the reduction gearbox.

Referring now to FIG. 2, reduction gear motor assembly 16 is mounted to central motor support portion 28 with screws 47. Referring to FIG. 3, reduction gear motor assembly 16 is of conventional construction and includes a variable speed electric motor 48 and a reduction gearbox 50 having a motor assembly output shaft 52.

Referring back to FIG. 2, wiper shaft support 18 is a shaped section of stainless steel bar stock and is screwed to central motor support portion 28 through three mounting apertures 49. Although wiper shaft support 18 has been affixed to central motor support portion 28 by screws in this exemplary embodiment, other methods of attachment, including forming wiper shaft support 18 integrally with central motor support portion 28, are considered to be within the scope of the invention taught herein. Wiper shaft support 18 has a bushing aperture 56 within which a wiper shaft support bushing 54 is press fit.

Wiper shaft 20 is a section of conventional stainless steel shafting that has a first wiper shaft end 60 rotatably entrapped within bushing 54 and a second wiper shaft end 62 provided with a number of protrusions 64 for engaging a wiper blade assembly. During installation second wiper shaft end 62 is installed through a wiper shaft aperture 65

(FIG. 1) that is formed through the motorcycle windshield 12 and extends past the forward facing surface of motorcycle windshield a distance sufficient to allow a wiper assembly to be attached thereto.

Push rod linkage 26 includes a rigid stainless steel push rod 66 and a rigid stainless steel wiper shaft arm 72. Wiper shaft arm 72 is rigidly connected to wiper shaft 20 and extends radially outward therefrom. Push rod 66 is rotatably mounted at a first push rod end 69 to a push rod connecting pin 70 that extends outwardly from a planar surface 74 of rotating crank wheel 22 and is pivotally connected at a second push rod end 71 to wiper shaft arm 72 in a manner such that movement of push rod end 69 about motor assembly output shaft 52 causes wiper shaft 20 to rotate back and forth through an angular displacement of about one-hundred degrees. It can be seen that through this arrangement rotation of rotating crank wheel 22 about motor assembly output shaft 52 causes wiper shaft 20 to rotate back and forth moving a wiper assembly attached to wiper shaft end 62.

Figure 4:
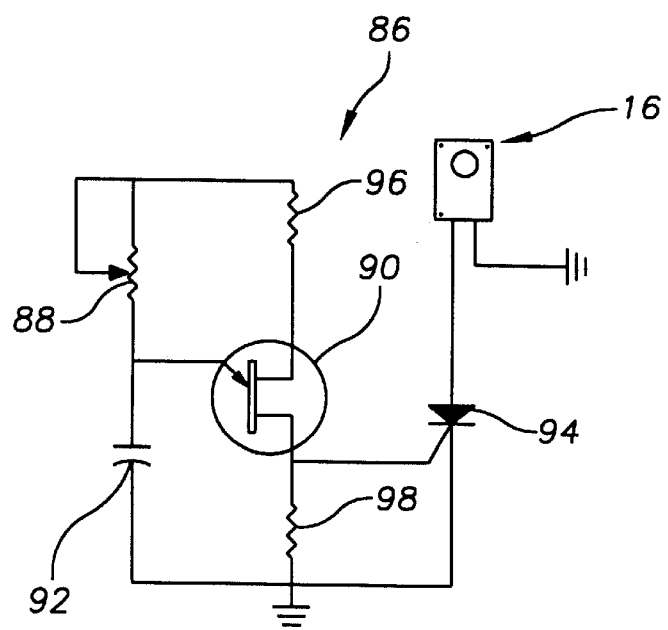
FIG. 4 is a schematic diagram of an exemplary wiper speed motor control circuit of the motor speed controller.

With reference to FIG. 4, variable speed control mechanism 24 (FIG. 1) includes a conventional intermittent drive circuit, generally designated 86 that includes a variable resistor 88, a transistor 90, a capacitor 92, a silicon controlled rectifier 94, and a pair of biasing resistors 96,98. In this embodiment, variable resistor 88 is adjustable by the user to select a desired wiping frequency.

It can be seen from the preceding description that a motorcycle windshield wiper drive assembly has been provided that is easily mounted to a motorcycle windshield and that includes a wiper drive shaft coupled to a drive motor through a pivoting push rod linkage and a rotating crank wheel.

It is noted that the embodiment of the windshield wiper drive assembly described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A windshield wiper drive assembly comprising:

a mounting bracket having a central motor support portion, a first bracket end connecting portion having a first mounting aperture formed therethrough, and a second bracket end connecting portion having a second mounting aperture formed therethrough;

a reduction gear motor assembly mounted to said central motor support portion and having a motor assembly output shaft, said reduction gear motor assembly including an electric motor;

a wiper shaft support secured to said central motor support portion and having a wiper shaft support bushing provided within a bushing aperture;

a wiper shaft having a first wiper shaft end rotatable entrapped within said wiper shaft support bushing and a second wiper shaft end;

a rotating crank wheel centrally mounted to said motor assembly output shaft by a central shaft connection aperture and having a push rod connecting pin extending outward from a planar surface thereof; and a push rod linkage including a rigid push rod rotationally connected to said push rod connecting pin at a first push rod end thereof and pivotally connected at a second push rod end thereof to a wiper shaft arm that extends radially from said wiper shaft;

said central motor support portion being substantially rectangular shaped and having a planar mounting surface;

said first bracket end connecting portion and second bracket end connecting portion being, respectively, each connected to said central motor support portion by a connecting section, each connecting section having a planar surface that is oriented at an angle with respect to said planar mounting surface of about forty-five degrees.

2. The windshield wiper drive assembly of claim 1 wherein:

said electric motor is a variable speed electric motor; and further including:

a variable speed control mechanism in controlling connection with said variable speed electric motor in a manner to allow a user to adjust the speed of said variable speed electric motor.

3. The windshield wiper drive assembly of claim 1, wherein:

said mounting bracket is constructed from a length of stainless steel bar stock that has been bent to form said central motor support portion, said first bracket end connecting portion, and said second bracket end connecting portion.

4. The windshield wiper drive assembly of claim 2, wherein:

said mounting bracket is constructed from a length of stainless steel bar stock that has been bent to form said central motor support portion, said first bracket end connecting portion, and said second bracket end connecting portion.

* * * * *